May 20, 1924.
S. E. CRESSEY
1,494,464
METHOD OF THREADING TAPERED PINS AND RECESSES
Filed Nov. 8, 1920
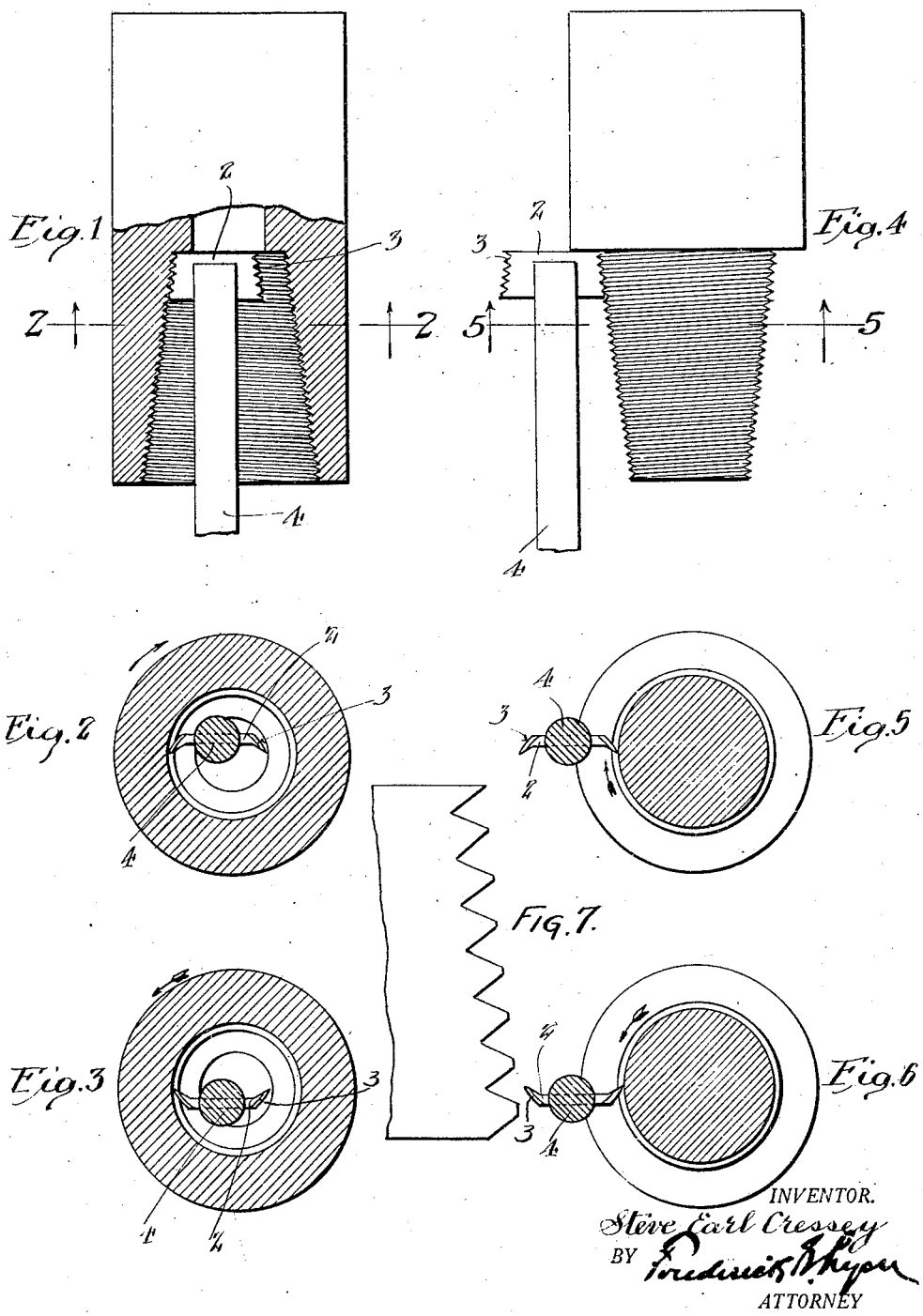

Patented May 20, 1924.

1,494,464

UNITED STATES PATENT OFFICE.

STEVE EARL CRESSEY, OF SAN PEDRO, CALIFORNIA.

METHOD OF THREADING TAPERED PINS AND RECESSES.

Application filed November 8, 1920. Serial No. 422,485.

*To all whom it may concern:*

Be it known that I, STEVE EARL CRESSEY, a citizen of the United States, residing at San Pedro, in the county of Los Angeles and State of California, have invented a new and useful Method of Threading Tapered Pins and Recesses, of which the following is a specification.

This invention relates to a method of threading tapered pins or recesses and is particularly directed to a method employing a chasing tool or gang cutter having an angular, positive, and definite longitudinal feed.

The object of the invention is to provide a method whereby tapered pins or recesses may be threaded with maximum speed and accuracy, and without producing tool marks.

Another object is to provide a method whereby tendency of the tool to dig into the work is obviated and by which no tool chatter is produced.

Various other objects and advantages will be more fully apparent from the following description of the accompanying drawings which form a part of this disclosure, and which illustrate in semi-diagrammatic form, the principles of the invention.

Of the drawings:

Figure 1 is a plan section illustrating the method of cutting a right hand thread in the tapered recess or bore of a coupling element.

Fig. 2 is a vertical transverse section on line 2—2 of Fig. 1.

Fig. 3 is a section similar to Fig. 2, showing the tool reversed for cutting a left hand internal thread.

Fig. 4 is a plan section similar to Fig. 1, illustrating the method of cutting a right hand thread on a tapered pin.

Fig. 5 is a vertical transverse section on line 5—5 of Fig. 4.

Fig. 6 is a section similar to Fig. 5 showing the tool reversed for cutting a left hand external thread.

Fig. 7 is an enlarged fragmentary plan view of the tool.

While the method herein described may be utilized for cutting various forms of external or internal threads or any form of tapered pin, rod, pipe or coupling, it is particularly adapted for use in the threading of tapered pins and socket members of well drilling and pumping equipment, such as for instance, drills, underreamers, jars, spears, fishing tools, casing and tubing couplings, etc.

Elements of the above character are constructed of tough steel which renders them difficult to machine to the degree of accuracy demanded by the heavy duty to which they are subjected. Therefore, in threading these elements the tool used must function to produce a shearing cut instead of a scraping cut as produced by the usual form of taps and thread cutting dies. For this reason, all previous attempts to thread these elements with the ordinary forms of thread chasers or gang tools, and by the ordinary method of feeding the tool, have been unsuccessful for the reason that the tendency of a shear-cut tool, is to dig into the work and away from the line of tool feed, this causing a flexing tension on the tool holding and feeding mechanism, and when said tension overcomes the resistance of the work against the tool, the parts spring back to their true positions, causing the tool to jump or chatter, the cut produced being of a stepped or uneven character, showing tool marks to an excessive degree.

Heretofore, these elements of well equipment have been threaded by the use of a single tool, and the operation has been relatively slow and expensive, whereas, by the herein described method which successfully utilizes a chasing tool or gang cutter, the time of the threading operation has been greatly reduced while the work produced is of a high degree of accuracy and of superior finish.

In the present method I employ a gang cutter 2 preferably of the form illustrated in Fig. 7 providing a plurality of teeth 3 having a substantial degree of relief in a circular direction backwardly from their cutting edges, with the faces of the teeth angled inwardly away from the points of the teeth. As shown, two of the teeth are not of truncated form, and the succeeding teeth are progressively truncated to provide a progressive thread cutting action as do the standard forms of taps and dies.

In the following description, it is to be understood that the work is carried by a suitable chuck associated with the headstock of a screw cutting lathe having the usual tool carriage, and cross feed slide carrying a tool post and associated with the taper attachment. This general type of lathe is now so well known that illustration and detailed description thereof would herein be superfluous.

The chasing tool or gang cutter 2 is held in a suitable holder, indicated at 4, and the holder is clamped in the tool post of the lathe.

This arrangement provides for the translation of the tool relative to the work and in an angled plane corresponding to the degree of taper of the pin or recess to be threaded.

In cutting a right hand thread in a tapered bore, as illustrated in Figs. 1 and 2, the tool is positioned with its cutting edges downwards, or it may be said that the tool is upside down when compared with the position of an ordinary lathe tool used in the usual method of turning. The work is rotated in a clockwise direction as indicated by the arrow in Fig. 2. Considering that this rotation of the work is in a right hand direction, it is coincident to the circular progression of the thread which is also right hand for the right hand thread.

In the threading operation the tool is inserted into the bore and engaging the inner end of the wall of the bore, the tool is retracted from the bore in an angled plane following the angle of taper and progressively cutting the thread from the base of the bore outwardly. This may be said to be cutting a thread backwardly and as the tendency of the tool is to dig into the work, this tendency assisting the tool in following the taper and relieving the tool feeding elements of strain. In other words, this digging in tendency urges the tool transversely outwardly and by feeding the tool along the taper and outwardly both the feed and the digging in tendency are exerted in the same general outward direction, whereas if the tool be fed from the outer end of the bore and inwardly these two forces would act in opposite directions as the digging in tendency would still be transversely outwardly. Amplifying in a simple manner, the angled blade of a hoe dragged over a hill of sand will have a natural tendency to dig into the sand, no matter if it is dragged uphill or down, and when dragged down hill the digging in tendency being downwards, is exerted in a direction coincident to the downward drag. By giving the hoe blade the proper angle the depth to which the blade will dig into the sand can be controlled regardless of the power exerted in the dragging of the hoe, but in dragging the hoe uphill the digging in tendency still being in a downward direction. is opposed to the upward direction of the drag and will be exerted to continually dig further and further into the sand, unless a sufficient lifting force be exerted on the hoe handle to overcome the digging in tendency.

Therefore, as the cutting tool 2 has a natural digging in tendency due to the angled shape of its shear cutting teeth, it will be evident that the feeding thereof in a direction reverse to the lead of the thread is of great importance, particularly for the reason that by so doing the tool and associated parts are relieved of the transverse outward strain which would tend to flex the tool outwardly from its proper path of feed as the tool digs into the metal, such flexing continuing until the inherent spring of the tool holder and associated parts overcomes the digging in tendency of the tool which then will jump back to its normal path of travel causing a stepped effect in the work. At certain speeds and under certain conditions this jumping of the tool, would be of such degree and frequency as to amount to a chatter such as produces tool marks.

In cutting a left hand internal thread the work is rotated reversely or in a counter clockwise direction and the tool turned with the cutting edges upwardly as illustrated in Fig. 3, the translation of the tool being from the inner end of the bore outwardly as in the previous instance.

In the threading of tapered pins, as illustrated in Figs. 4 to 6, the same method is employed excepting that in this case the digging in tendency is transversely inwardly and the tool is fed from the large diameter of the pin to the smaller diameter.

In either case the outer end of the thread will herein be termed the terminal end and the opposite, or inner end thereof, the base of the thread. In machining coarse threads by the above method the tool may be fed along the work several times, each time cutting deeper until the complete thread is finished.

By this method of threading tapered work it will be observed that the chasing tool is translated along the work in the direction in which the surface of the work, adjacent the point of the surface the tool engages, will continually recede or draw away from the point of the tool. There is no tendency for the tool to dig more deeply into the work it is threading and be bent backwardly, and chattering of the tool will be eliminated. This is accomplished in both the case where external threads are formed on a tapered member and where internal threads are formed on a tapered member. When external threads are formed on a tapered member the tool first engages the tapered portion having the largest diameter and is moved along the tapered portion to the end of least diameter and when internal threads are formed on a tapered member the tool first engages the tapered portion at its smallest diameter and is moved to the end of the greatest diameter. In either case it will be noticed that due to the change of diameter of the surface of the work the tool is engaging that the surface closely adjacent the point the tool engages will tend to draw away or recede from the point or points of the tool. This receding of the surface adjacent the tool has been found to have an important effect upon eliminating chattering of the tool.

By this method I have successfully utilized a chasing tool or gang cutter in threading tapered pins and recesses and have to a great degree reduced the time required for such operations over that required for the same operations with the use of a single tool.

I claim:

1. The method of threading tapered work, which includes rotating the work, engaging the inner end of the conical surface of the work with a chasing tool, and translating the tool following the angle of the taper in the direction towards the outer end of the conical surface of the work.

2. The method of threading tapered work, which includes rotating the work, engaging the conical surface of the work with a chasing tool, and translating the tool following the angle of the taper, said tool being translated in the direction in which the suface of the work, adjacent the contacting surface of the tool and work will continually recede from said tool.

3. A method of forming internal threads on a tapered member, which consists in rotating the work, engaging the work at the end of the tapered portion having the smallest diameter with a chasing tool, and translating the tool to the end of greatest diameter while following the angle of the taper.

Signed at Los Angeles, California, this 1st day of November, 1920.

STEVE EARL CRESSEY.

Witnesses:
CLARENCE B. FOSTER,
L. BELLE WEAVER.